United States Patent

[11] 3,556,234

| [72] | Inventor | Robert F. Moreno<br>946 Bloomwood Road, San Pedro, Calif. 90731 |
|---|---|---|
| [21] | Appl. No. | 869,796 |
| [22] | Filed | Oct. 27, 1969 |
| [45] | Patented | Jan. 19, 1971 |

[54] UNDERWEIGHT CAN DETECTING AND FILLING APPARATUS
8 Claims, 5 Drawing Figs.

[52] U.S. Cl. ................................................. 177/46,
177/50, 177/54, 177/59, 177/122; 141/83;
209/121
[51] Int. Cl. ....................................................... G01g 23/18,
G01g 15/00, G01g 13/16
[50] Field of Search ............................................ 177/45-
—48, 50, 54, 55, 59, 60, 116, 118, 119, 122, 123;
209/121; 141/83

[56] References Cited
UNITED STATES PATENTS

| 2,723,748 | 11/1955 | Simpson........................ | 209/121UX |
| 3,333,648 | 8/1967 | Dodd............................. | 177/55 |
| 3,448,778 | 6/1969 | Ramsay......................... | 141/83 |

FOREIGN PATENTS

| 781,734 | 8/1957 | Great Britain................ | 177/55 |

*Primary Examiner*—Robert S. Ward, Jr.
*Attorney*—William C. Babcock

ABSTRACT: A circular power-driven rotating table with which a number of circumferentially spaced, horizontal platforms are associated, and on which platforms open cans containing both solids and liquids are sequentially delivered. During the time each can is supported on one of the platforms it is weighed, and if underweight, liquid material is automatically added thereto to bring the can up to a predetermined weight. If one of the cans is so far underweight that it cannot be brought up to said predetermined weight within a particular time interval, the apparatus actuates an alarm signal to so indicate.

PATENTED JAN 19 1971
3,556,234
SHEET 1 OF 2
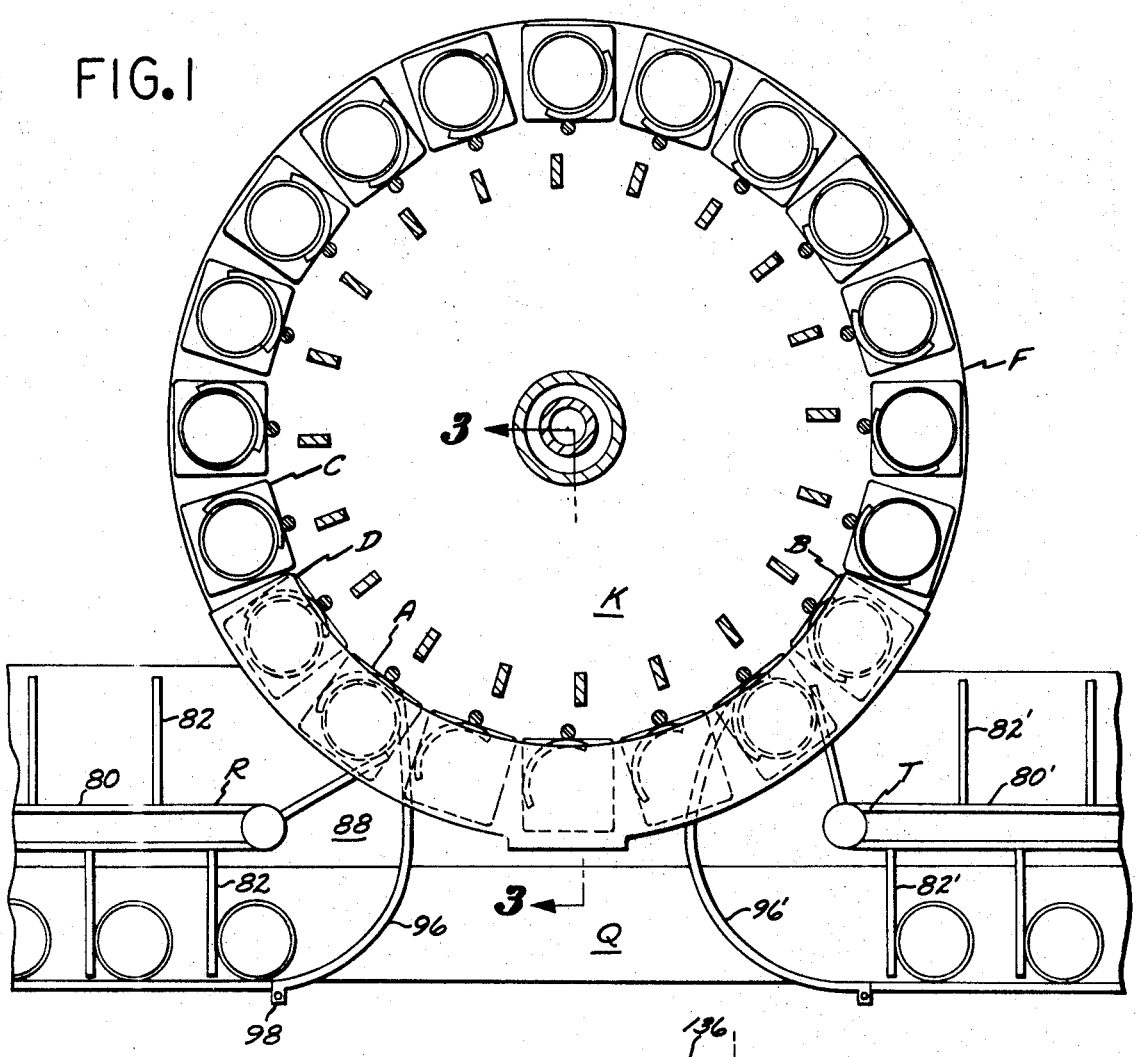
FIG.1
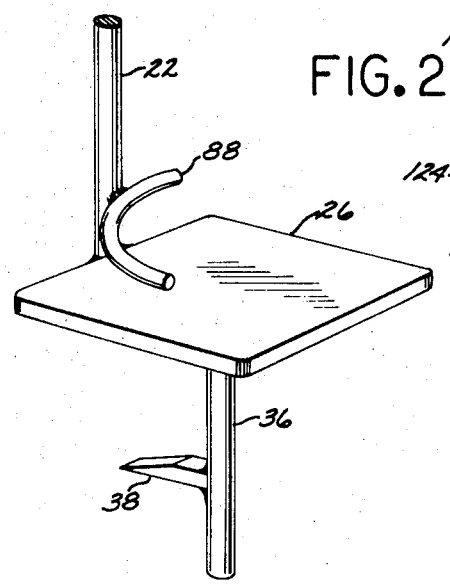
FIG.2
FIG.5
INVENTOR.
ROBERT F. MORENO
BY
William P. Babcock
ATTORNEY

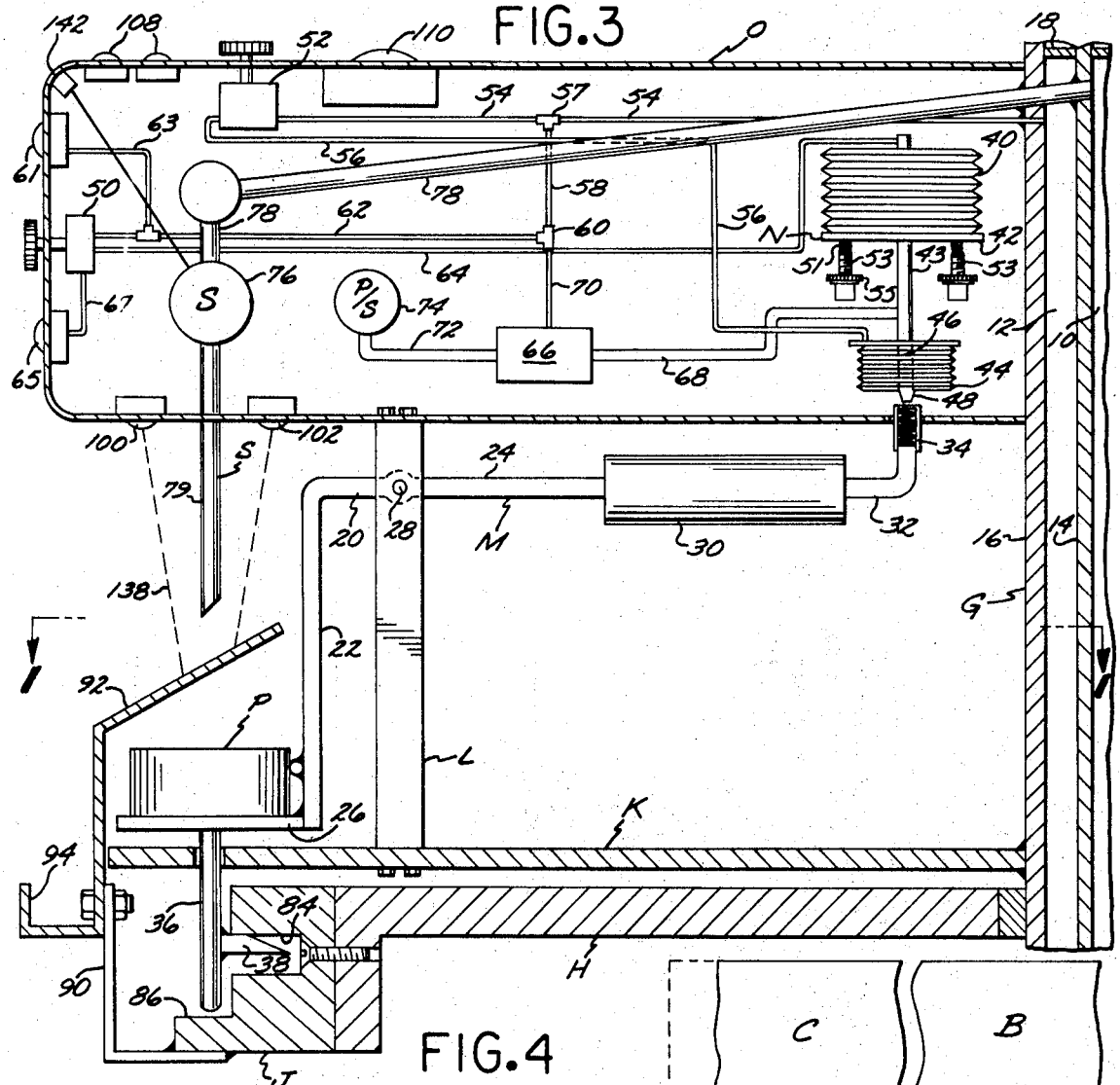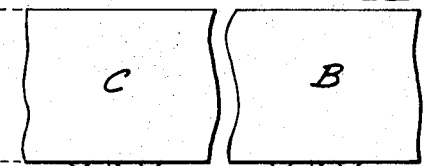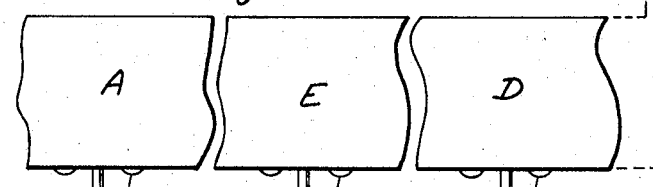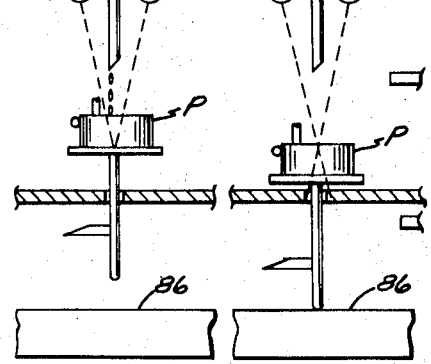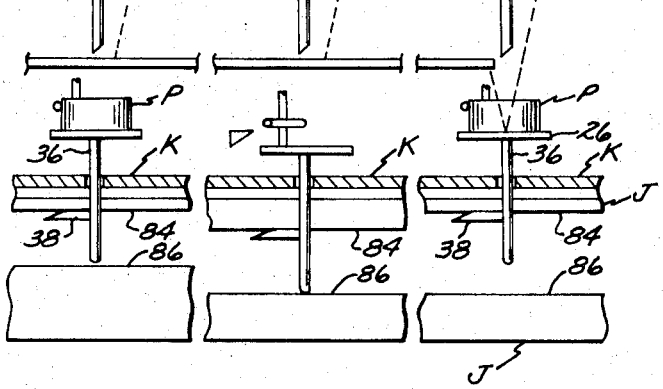

3,556,234

UNDERWEIGHT CAN DETECTING AND FILLING APPARATUS

BACKGROUND OF THE INVENTION

1. Field of the Invention

An apparatus for sequentially weighing a stream of cans, adding liquid to those cans which are underweight to bring them up to proper weight standards, and signaling when cans are present that cannot be brought up to the required weight within a specified period of time.

2. Description of the Prior Art

In the packing of solid food products in cans, such as tuna, a major problem encountered by the cannery is to be certain that the weight of tuna and oil in each can is at least as great as the weight specified on the label. If the weight of the food product in a can is substantially over the weight specified on the label, this overweight is to the financial disadvantage of the cannery. However, if the weight of the food product in a can is under the weight specified on the label, the shipment may be condemned by governmental authorities as being a fraud on the public, again to the disadvantage of the cannery.

Prior to the present invention there has been no rapid, economical method of detecting underweight cans prior to the sealing thereof, yet after detection thereof, rapidly adding a liquid thereto to bring them up to a predetermined weight. By the use of the present detecting and filling apparatus underweight cans are rapidly and economically detected, and additional liquid added thereto to bring them up to a predetermined weight, with both operations being performed while the cans are in motion, traveling toward a sealing unit.

SUMMARY OF THE INVENTION

A plurality of rotating, circumferentially spaced platforms on which cans containing both solids and liquids are sequentially deposited to be automatically weighed, and to which those cans that are underweight, additional liquid is added to bring them up to a predetermined weight.

A major object of the present invention is to provide an apparatus for sequentially weighing each of a stream of moving cans containing a liquid, and upon completion of the weighing operation, adding liquid to to those requiring the same to the extent that the contents of each can meets a predetermined weight.

Another object of the invention is to provide an apparatus that not only weighs the cans, adds additional liquid to those cans requiring same, but signals when cans are present which are so far underweight that they cannot be brought up to said predetermined weight within a specific time interval. If desired, means may be provided to automatically count the total number of cans passing through the apparatus, as well as the number of cans that are underweight.

BRIEF DESCRIPTION OF THE DRAWINGS

FIG. 1 is a combined top plan and horizontal cross-sectional view of the apparatus;

FIG. 2 is a perspective view of the weighing platforms;

FIG. 3 is a vertical cross-sectional view of one-half of the apparatus;

FIG. 4 is a diagrammatic view of operation of the weighing platforms; and

FIG. 5 is a diagrammatic view of the electric circuit associated with the apparatus.

DESCRIPTION OF THE PREFERRED EMBODIMENT

The underweight can filling apparatus F includes a hollow vertical driven shaft G in which longitudinally extending passages 10 and 12 are defined that carry a liquid and air under pressure. When the principal contents of the cans are fish products, the liquid will be an edible oil.

Shaft G extends upwardly through a horizontal circular plate H and lower cam-defining means J are secured to the peripheral edge thereof. Shaft G supports horizontal circular table K above plate H, as best seen in FIG. 3.

A number of circumferentially spaced, vertical uprights L are mounted on table K, each of which uprights pivotally support a can-weighing assembly M, the details of which may best be seen in FIG. 3. A pneumatically operated weight-sensing assembly N is provided for each can-weighing assembly M (FIG. 3). The weight-sensing assemblies N are contained in an annulus-shaped housing 0 that is rigidly secured to the shaft G.

Cans P are not only delivered to the apparatus F by a conveyor Q, but moved away therefrom as well by the same conveyor as shown in FIG. 1. A can-positioning assembly R is disposed to the left of the table K (FIG. 1), which sequentially removes the cans P from the conveyor Q and places the same on the can-weighing assemblies M. During the time the cans P are mounted on the weighing assembly M, oil or other liquid is added thereto from a dispensing assembly S if the cans are underweight.

After the cans P have been weighed, counted and liquid added to those that are underweight, the cans are returned to the conveyor Q by a can-removing assembly T located to the right of Table K, as viewed in FIG. 1. After return to the conveyor Q, the cans P are transported to facilities (not shown) where they are sealed and subsequently labeled.

Shaft G, as may best be seen in FIG. 3, is defined by two concentrically spaced, cylindrical shells 14 and 16 provided with end pieces 18 at the top and bottom thereof. The shells 14 and 16, and end pieces 18, cooperatively provide the passages 10 and 12. Oil passage 10 is connected to the dispensing assemblies S, as may be seen in FIG. 3.

Each can-weighing assembly M includes an inverted L-shaped member 20 comprising first and second legs 22 and 24, respectively, disposed in normal relationship. First leg 22 supports a can-receiving platform 26. Second leg 24 is pivotally supported by a pin 28 from one of the uprights L, as viewed in FIG. 3, and in turn, supports a weight 30. An L-shaped extension 32 of second leg 24 supports a spring-loaded baffle 34. A rigid lower cam-engageable member 36 depends from each platform with the member 36 supporting a horizontal upper cam-engageable member 38 thereon.

Each platform 26 is a part of one of the weight-sensing assemblies N. Each assembly N includes a first bellows 40, the upper portion of which is held at a fixed position relative to housing 0 by conventional means (not shown). The lower portion of first bellows 40 is defined by a plate 42 from which a tube 43 depends. A second bellows 44 of annulus shape is situated below tube 43, affixed to the lower extremity thereof. A longitudinally extending passage 46 in second bellows 44 is in communication with tube 43. The passage 46 is also in communication with a conical nozzle 48 that extends downwardly from the second bellows 44. Nozzle 48 is in vertical alignment with a baffle 34. The baffle 34 is spring loaded to prevent damage to nozzle 48 upon forceful contact therewith.

Each weight-sensing assembly N includes first and second air pressure control valves 50 and 52 that are mounted on housing 0. The inlet to second valve 52 is connected by a tube 54 to the air passage 12, as shown in FIG. 3. The discharge from second valve 52 is provided by a tube 56 extending therefrom that is in communication with the interior of second bellows 44. By varying the air pressure in second bellows 44, the nozzle 48 may be moved vertically relative to the housing 0.

Tube 54 has a tee 57 therein from which a tube 58 extends to a second tee 60. A tube 62 extends from second tee 60 to a first pressure-reducing valve 50. The discharge of valve 50 is connected to a tube 64 that is in communication with the interior of first bellows 40. By varying the air pressure in first bellows 40 the second bellows 44 may be moved vertically relative to housing 0. Vertical positioning of each nozzle 48 may be achieved by manual manipulation of valves 50 and 52. A gauge 61 is connected to tube 62 by a tube 63. The gauge 61 visually indicates the pressure of the air supplied to the tube 56 by the passage 12. A second gauge 65 is connected to valve 50 by a line 67 and indicates the pressure of the air supplied to bellows 40. Vertical adjustment of the nozzles 48 may also be achieved by vertical movement of spring 51 that bears against plate 42. The spring 51 may be moved vertically by a threaded member 53 that engages tapped bores in a plate 55 rigidly secured to housing 0.

An air pressure booster relay 66 is connected by a tube 68 to tube 43. Air is supplied to booster 66 through a tube 70 that extends from second tee 60. Air pressure booster relay 66 is connected by a tube 72 to a normally closed pressure switch 74.

When the air pressure in tube 68 exceeds a predetermined level, booster 66 is actuated to discharge air from tube 70 to tube 72 to open switch 74 to break the circuit to a solenoid operated, normally closed valve 76 that is connected by tube means 78 to the liquid passage 10. A liquid-dispensing tube 79 depends from valve 76, and is centered above one of the platforms 26.

Cans P are delivered to the left-hand portion of conveyor Q in spaced, longitudinal relationship by a screw conveyor (not shown). The can-positioning assembly R includes an endless driven belt 80 situated above conveyor Q and inwardly therefrom. A number of longitudinally spaced fingers 82 project outwardly from belt 80 that sequentially slide the cans P across a surface 83 onto the platforms 26. The rate at which the conveyor Q moves is synchronized with the speed at which table K rotates to make the above described transfer possible.

The cam-defining means J, as shown in FIG. 3, extend circumferentially around the plate H and define upper and lower endless cam surfaces 84 and 86, respectively. The elevations of the cam surfaces 84 and 86 varies as they proceed around plate H, as does the spacing between the cam surfaces.

When one of the platforms 26 is at the position A shown in FIGS. 1 and 4, the cam surfaces 84 and 86 dispose the platform at the same elevation as surface 83 to permit one of the fingers 82 to slide a can P onto the platform. An arcuate stop 88 secured to leg 22 prevents a can P from inadvertently sliding from the platform after placement thereon. A bracket 90 projects upwardly above plate H, as shown in FIG. 3, and supports a non-light-reflecting shield 92 that extends from B to D, as best seen in FIG. 1. Shield 92 slopes downwardly and outwardly, and is situated below the lower extremities of dispensing tubes 78. Liquid discharged onto the upper surface of shield 92 runs downwardly therefrom to a trough 94. The trough 94 is connected to a liquid storage facility (not shown). An arcuate guide 96 cooperates with fingers 82 to move the cans P from conveyor Q onto the platforms 26. The guide 96 is removably supported in the position shown in FIG. 1 by conventional means 98 for reasons that will later be explained.

An electric circuit and the components, shown in FIG. 5, are associated with each platform 26. The circuit and components are contained within the confines of the housing 0.

The components in the electric circuit shown in FIG. 5 include for each can-weighing assembly M an incandescent bulb 100, and a photoelectric cell 102. Each circuit also includes a normally open switch 107 which, when closed, causes a red warning light 108 to be illuminated, and an electrically operated horn 110 to be activated. One terminal of a source of electric power 112 is connected to ground 114 by a conductor 116. The other terminal of power source 112 is connected by an electric conductor 118 to one terminal of the photoelectric cell 102.

An electric conductor 120 extends from junction point 118a in conductor 118 to a junction point 122a in an electric conductor 122. Conductor 122 is connected to one terminal of bulb 100, with the other terminal of the bulb being connected by a conductor 124 to ground 114. Conductor 122 is connected to the normally open switch 107. Contact 126 of switch 107 is connected by conductors 128 to warning light 108 and horns 110. The second terminal of horn 110 is connected by a conductor 130 to ground 114.

Photoelectric cell 102 is connected by an electric conductor 132 to one terminal of pressure switch 74. The other terminal of pressure switch 74 is connected by an electric conductor 134 to one terminal of solenoid operated valve 76. The other terminal of valve 76 is connected by an electrical conductor 136 to ground 114.

When one of the platforms 26 has reached the position D shown in FIGS. 1 and 4, the cans P, if underweight, will allow the weights 30 to pivot the can-weighing assemblies M in a clockwise direction until the upper members 38 contact upper cam member 84. Each baffle 34 associated with an underweight can P is then disposed a maximum distance from nozzle 48. As the underweight can P moves from under the non-light-reflecting shield 92 at position D, a beam of light 138 is reflected from the contents in the can, as illustrated in FIG. 5, to the photoelectric cell 102. Electric current thereafter flows through switch 74 to solenoid operated valve 76 to open the latter and permit liquid to discharge into the underweight can.

Discharge of liquid into the underweight can P gradually brings it up to a predetermined weight. When the underweight can P has been brought up to the predetermined weight, the can pivots the can-weighing assembly M (FIG. 3) in a counterclockwise direction, whereby the baffle 34 then contacts nozzle 48 to prevent discharge of air therefrom. The air pressure in tube 68 now builds up rapidly activating air relay booster 66. Air relay booster 66 then causes a buildup of air pressure in tube 72. This pressure buildup in tube 72 opens switch 74, with the circuit to solenoid operated valve 76 being broken. Valve 76 immediately assumes a closed position, and further dispensing of liquid into the originally underweight can P ceases.

Clockwise rotation of each can P on the apparatus continues, as viewed in FIG. 1, and, upon reaching position B, the platform 26 occupies the position illustrated in FIG. 4 where member 36 is sliding on lower cam surface 86. The can-removing assembly T, in cooperation with an arcuate guide 96' then returns the can to the conveyor Q. Can-removing assembly T is of the same structure as that of can-positioning assembly R. The elements comprising assembly T are identified by the same numerals as used with assembly R, but to which primes have been added.

If a can P entering the apparatus F at position A and progressing through position D to position C is at a predetermined weight or overweight, the member 36 will slide along lower cam surface 86, and baffle 34 will be in contact with nozzle 48. Due to this contact, the air pressure in tube 72 increases to maintain switch 74 in an open position. Due to switch 74 being open, the beam of light 138 will not, in cooperation with photocell 102, complete an electrical circuit to actuate solenoid operated valve 76, and no liquid will be dispensed into the can.

Should a can P be so underweight that it is not brought up to a predetermined weight as it is moved from position D to position E on the apparatus F, because of its elevated position, the can contacts the normally open switch 107 and closes same. Closing of switch 107 completes a circuit to warning lights 108 and also actuates horn 110. A holding relay (not shown) normally is associated with switch 107 to energize lights 108 and horn 110 until an attendant comes to the apparatus F and manually breaks the circuit to the lights and horn.

If desired, closing of switch 107 may energize a conventional electrically operated device, such as a solenoid and plunger assembly, to displace the underweight can from the supporting platform 26, or from the conveyor Q when it reaches a desired position thereon.

The guides 96 and 96', as well as assemblies R and T may be removed from association with the apparatus F, and permit the conveyor Q to transport the cans P directly to the sealing unit (not shown). Conveyor Q will be used in this manner only when maintenance work is being performed on the apparatus F.

A stationary crossbar or squeegee 140 extends across the path of the platforms 26 at position E, and scrape any foreign material from the platforms as they pass the crossbar or squeegee. Counting of the cans P that pass through the apparatus is by a conventional counter mechanism 142 shown in FIG. 3.

I claim:

1. In combination with a conveyor on which open-topped cans are positioned, each containing quantities of fluids and solids, an apparatus disposed adjacent said conveyor for detecting underweight cans and adding a liquid thereto until said cans are of a predetermined weight, including:
   a. a driven, hollow, interiorly partitioned vertical shaft that defines first and second passages in which liquid and air, respectively under pressure, is contained;
   b. a horizontal, circular table rigidly supported from said shaft and rotated thereby;
   c. A plurality of circumferentially spaced platforms pivotally supported above said table;
   d. first means for sequentially removing said cans from said conveyor and depositing the same on said platforms;
   e. second means for determining whether said cans are under said predetermined weight after deposition thereof on said platforms;
   f. third means for adding liquid to each of said cans on said platforms from said first passage;
   g. fourth means for actuating said third means to add liquid to those of said cans on said platform which are underweight;
   h. fifth means for sensing when said underweight cans on said platforms have had said liquid added thereto to the extent that they are of said predetermined weight, and for stopping said third means from adding further liquid to said cans that were initially underweight; and
   i. sixth means for removing said cans from said table after being subjected to said filling operation and redepositing the same on said conveyor.

2. An apparatus as defined in claim 1 which further includes:
   j. seventh means for actuating an alarm if one of said cans on said platforms is so underweight that it is not brought up to said predetermined weight within a specific time interval by said third means.

3. A device as defined in claim 1 wherein said first means includes:
   j. an arcuate guide that extends transversely across the upper portion of said conveyor toward said table;
   k. a driven endless belt that runs parallel to said conveyor; and
   l. a plurality of longitudinally spaced fingers on said belt that cooperate with said guide to sequentially remove said cans from said conveyor and deposit said cans on said platforms.

4. An apparatus as defined in claim 1 wherein said second means includes:
   j. a plurality of circumferentially spaced uprights on the upper peripheral portion of said plate;
   k. a plurality of inverted L-shaped members pivotally supported from said uprights, which members include first downwardly extending legs that support said platforms, and second generally horizontal legs that extend inwardly toward said shaft; and
   l. a plurality of weights mounted on said second legs, which weights pivot said members in a direction to cause said second legs to move downwardly toward said table to first positions when said cans on said platforms are underweight.

5. An apparatus as defined in claim 1 which said third means includes:
   j. a plurality of normally closed solenoid operated valves disposed at fixed locations relative to said table, with the discharge of each of said valves being located above one of said cans supported on one of said platforms;
   k. seventh tube means connecting the inlets to said valves to said first passage; and
   l. a plurality of normally open electrical circuits connected to a source of electric power and to said solenoid operated valves.

6. An apparatus as defined in claim 5 wherein said fourth means includes:
   m. a plurality of sources of light disposed at fixed positions relative to said table that discharge beams of light downwardly to the contents of said cans on said platforms to be reflected upwardly therefrom as second beams;
   n. a plurality of normally nonconducting photocells in said circuits that occupy such fixed positions relative to said table as to receive said second beams and render the same electrically conductive, which cells when rendered electrically conductive, complete said circuits; and
   o. a plurality of normally closed switches in said circuits that are opened if said cans are at said predetermined weight or overweight to prevent said photocells from completing said circuits.

7. An apparatus as defined in claim 6 where said switches are air actuated, and said fifth means includes:
   p. a plurality of baffles supported from said second legs;
   q. a plurality of nozzles disposed at fixed positions relative to said table, with each of said nozzles being adapted to be contacted by one of said baffles; and
   r. a plurality of tubes connected to said second passage, each of which tubes are connected to one of said nozzles and one of said air actuated switches, with each of said baffles when moved into contact with one of said nozzles due to one of said cans being brought up to said predetermined weight, increasing the air pressure in one of said tubes to actuate one of said switches to place the same in an open position and break the circuit to one of said solenoid operated valves; each of which valves, when said circuit is so broken, assumes a closed position and ceases to dispense liquid into one of said cans on said platforms.

8. An apparatus as defined in claim 3 wherein said sixth means is of the same structure as that of said first means and serves to sequentially remove said cans from said platforms and return the same to said conveyor.